(12) United States Patent
Mitsuda et al.

(10) Patent No.: US 9,153,837 B2
(45) Date of Patent: Oct. 6, 2015

(54) ELECTRIC STORAGE DEVICE ELECTRODE AND METHOD FOR MANUFACTURING SAME

(75) Inventors: Kenro Mitsuda, Tokyo (JP); Kazuki Kubo, Tokyo (JP); Shigeru Aihara, Tokyo (JP); Daigo Takemura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 738 days.

(21) Appl. No.: 13/145,577

(22) PCT Filed: Mar. 17, 2010

(86) PCT No.: PCT/JP2010/054558
§ 371 (c)(1),
(2), (4) Date: Jul. 21, 2011

(87) PCT Pub. No.: WO2010/116872
PCT Pub. Date: Oct. 14, 2010

(65) Prior Publication Data
US 2011/0281170 A1 Nov. 17, 2011

(30) Foreign Application Priority Data
Apr. 10, 2009 (JP) .................................. 2009-096343

(51) Int. Cl.
*H01M 4/82* (2006.01)
*H01M 4/64* (2006.01)
(Continued)

(52) U.S. Cl.
CPC ............. *H01M 10/052* (2013.01); *H01G 11/28* (2013.01); *H01G 11/70* (2013.01);
(Continued)

(58) Field of Classification Search
USPC .......................... 429/209, 517, 233; 29/523.5
See application file for complete search history.

(56) References Cited

U.S. PATENT DOCUMENTS 6,096,455 A    8/2000  Satake et al.
6,800,398 B1 * 10/2004  Furuya et al. ................. 429/234
(Continued)

FOREIGN PATENT DOCUMENTS

JP    54-50837 A    4/1979
JP    4 328251      11/1992
(Continued)

OTHER PUBLICATIONS

International Search Report issued Apr. 27, 2010 in PCT/JP10/54558 filed Mar. 17, 2010.
(Continued)

*Primary Examiner* — Ula C Ruddock
*Assistant Examiner* — Thomas Parsons
(74) *Attorney, Agent, or Firm* — Oblon, McClelland, Maier & Neustadt, L.L.P.

(57) ABSTRACT

A method of manufacturing an energy storage device electrode in which breakage of electrode particles and warping of a collector are reduced, and internal resistance is lowered by lowering the contact resistance between the collector and an electrode layer. The method manufactures an electric double-layer capacitor electrode, and includes: forming a plurality of grooves that run in one direction in each of a front surface and rear surface of a collector foil; subsequently providing an electrode layer that includes plural electrode particles on each of the front surface and rear surface of the collector foil; and subsequently pressing the electrode layer toward the collector foil to move the plurality of electrode particles along the plurality of grooves until the plural electrode particles dig into the plurality of grooves.

11 Claims, 12 Drawing Sheets

(51) Int. Cl.
| | |
|---|---|
| *H01M 10/052* | (2010.01) |
| *H01G 11/28* | (2013.01) |
| *H01G 11/70* | (2013.01) |
| *H01G 11/86* | (2013.01) |
| *H01M 4/04* | (2006.01) |
| *H01M 4/13* | (2010.01) |
| *H01M 4/139* | (2010.01) |
| *H01M 4/70* | (2006.01) |
| *H01G 11/50* | (2013.01) |

(52) U.S. Cl.
CPC ............ *H01G 11/86* (2013.01); *H01M 4/0404* (2013.01); *H01M 4/0409* (2013.01); *H01M 4/13* (2013.01); *H01M 4/139* (2013.01); *H01M 4/70* (2013.01); *H01G 11/50* (2013.01); *Y02E 60/122* (2013.01); *Y02E 60/13* (2013.01); *Y10T 29/417* (2015.01); *Y10T 29/49115* (2015.01)

(56) References Cited

U.S. PATENT DOCUMENTS

2008/0165471 A1   7/2008   Kojima et al.

2009/0104529 A1   4/2009   Nishino et al.

FOREIGN PATENT DOCUMENTS

| | | |
|---|---|---|
| JP | 10 223214 | 8/1998 |
| JP | 10 340727 | 12/1998 |
| JP | 11-104712 A | 4/1999 |
| JP | 11 191418 | 7/1999 |
| JP | 3 016 769 | 3/2000 |
| JP | 2004 95399 | 3/2004 |
| JP | 2007 251025 | 9/2007 |
| JP | 2008 28028 | 2/2008 |
| JP | 2008028028 | * 2/2008 |
| WO | 2005 096333 | 10/2005 |
| WO | 2007 013375 | 2/2007 |

OTHER PUBLICATIONS

Office Action issued Feb. 18, 2014, in Japanese Patent Application No. 2013-105894 with English translation.

* cited by examiner

18

ELECTRIC STORAGE DEVICE ELECTRODE AND METHOD FOR MANUFACTURING SAME

TECHNICAL FIELD

The present invention relates to an energy storage device electrode which includes a collector and an electrode layer provided on a surface of the collector, and also to a method of manufacturing the energy storage device.

BACKGROUND ART

There has been conventionally known an energy storage device electrode for use in electric double-layer capacitors, lithium ion capacitors, lithium ion batteries, or other similar devices which includes collector foil and an electrode layer applied to a surface of the collector foil and which lowers, in order to lower internal resistance, the contact resistance between the collector foil and the electrode layer by pressing some of electrode particles of the electrode layer into the surface of the collector foil (see, for example, Patent Literature 1).

CITATION LIST

Patent Literature

Patent Literature 1: JP 7-335199 A

SUMMARY OF INVENTION

Technical Problem

A problem of that energy storage device electrode is that a large force applied to the collector foil and the electrode layer in order to press some of the electrode particles into the collector foil surface may break the electrode particles or warp the collector foil.

The present invention provides an energy storage device electrode and a method of manufacturing the energy storage device electrode in which the breakage of electrode particles and the warping of a collector are reduced, and internal resistance is lowered by lowering the contact resistance between the collector and the electrode layer.

Solution to Problem

A method of manufacturing an energy storage device electrode according to the present invention includes: forming a plurality of grooves which run in one direction in a surface of a collector; subsequently providing an electrode layer, which comprises a plurality of electrode particles, on the surface of the collector; and subsequently pressing the electrode layer toward the collector to move the plurality of electrode particles along the plurality of grooves until the plurality of electrode particles dig into the plurality of grooves.

Further, an energy storage device electrode according to the present invention includes: a collector having grooves formed in a surface thereof, the grooves running in one direction and being wider at one end than at another end; and an electrode layer provided on the surface of the collector and comprising electrode particles, which dig into the grooves at the another end.

Advantageous Effects of Invention

According to the method of manufacturing an energy storage device electrode of the present invention, the grooves are formed in the surface of the collector to run in the one direction, and the electrode layer is pressed toward the collector to move the electrode particles along the grooves until the electrode particles dig into the grooves, thereby obtaining the energy storage device electrode that reduces the breakage of the electrode particles and the warping of the collector and that is lowered in internal resistance by lowering the contact resistance between the collector and the electrode layer.

Further, according to the energy storage device electrode of the present invention, the grooves are formed in the surface of the collector which run in the one direction and are wider at the one end than at the another end, and the electrode particles dig into the grooves. The energy storage device electrode thus reduces the breakage of the electrode particles and the warping of the collector, and is lowered in internal resistance by lowering the contact resistance between the collector and the electrode layer.

DESCRIPTION OF EMBODIMENTS

Figure 1:
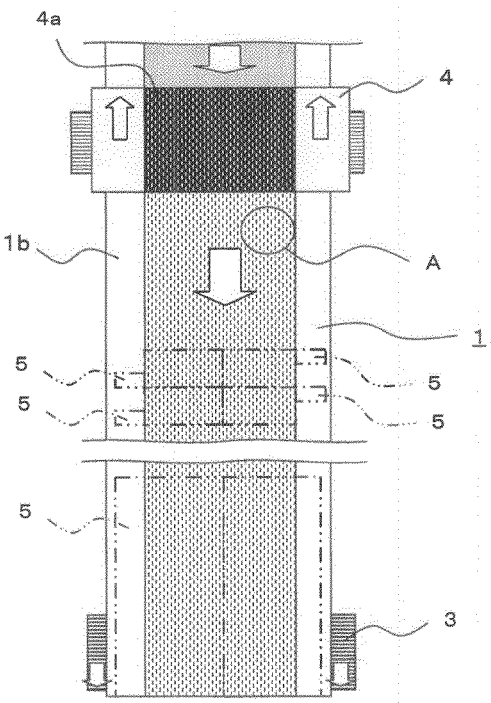
FIG. 1 A plan view illustrating an important portion of an apparatus for manufacturing an electric double-layer capacitor electrode according to a first embodiment of the present invention.

Embodiments of the present invention are described below with reference to the drawings. The description uses the same symbols to denote members/parts in the drawings that are the same as or equivalent to one another.

First Embodiment

Figure 2:
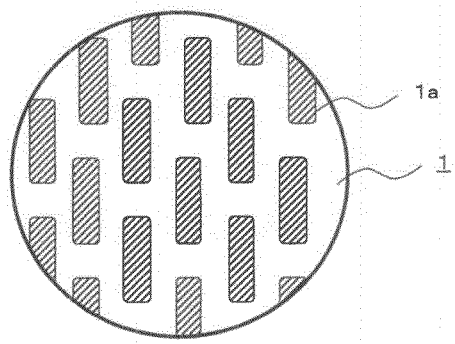
FIG. 2 An enlarged view of a portion A of FIG. 1.
Figure 3:
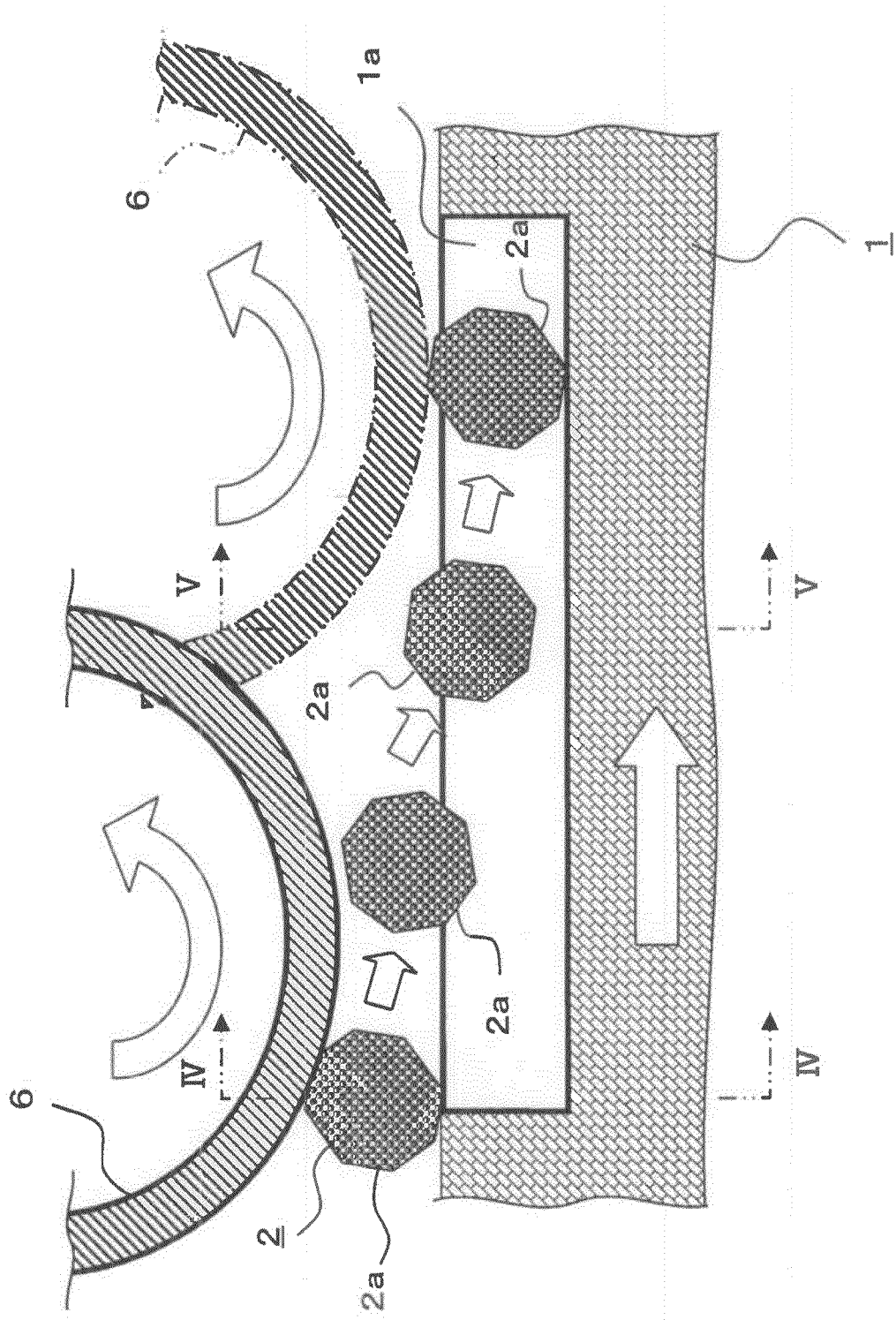
FIG. 3 A sectional view illustrating another important portion of the apparatus for manufacturing an electric double-layer capacitor electrode according to the first embodiment of the present invention.

FIG. 1 is a plan view illustrating an important portion of an apparatus for manufacturing an electric double-layer capacitor electrode (energy storage device electrode) according to a first embodiment of the present invention. FIG. 2 is an enlarged view of a portion A of FIG. 2. FIG. 3 is a sectional view illustrating another important portion of this manufacturing apparatus. An electric double-layer capacitor electrode according to this embodiment includes collector foil 1, which is a collector, and an electrode layer 2, which is applied to each of a front surface and rear surface of the collector foil 1. The electrode layer 2 may instead be applied to one of the front surface and rear surface of the collector foil 1. The collector foil 1 is made from a film of aluminum formed to a thickness of 50 μm, and is used in a positive electric double-layer capacitor electrode and a negative electric double-layer capacitor electrode both. The thickness of the collector film 1 is not limited to 50 μm.

A plurality of grooves 1a running in one direction are formed in each surface of the collector foil 1, and electrode particles 2a contained in the electrode layer 2 dig into the grooves 1a. The grooves 1a are each 0.2 mm to several mm in length in a longitudinal direction and several tens μm in width. The electrode particles 2a are made from activated carbon particles that are 15 μm to 50 μm in diameter. The electrode particles 2a may include ones that have a diameter of 2 μm to 3 μm in order to make the electric double-layer capacitor electrode thinner and thereby improve the electrode's "explosive power", that is, an ability to charge/discharge a large amount of current in an instant. Including just a small quantity of electrode particles 2a whose diameter is larger than the width of each of the grooves 1a of the collector foil 1 allows the electrode particles 2a to dig into the grooves 1a of the collector foil 1.

An electric double-layer capacitor that is formed from this electric double-layer capacitor electrode is a capacitor in which the positive electrode and the negative electrode are opposed to each other, a separator (not shown) is disposed between the positive electrode and the negative electrode, and the positive electrode, the negative electrode, and the separator are immersed in an electrolytic solution to utilize a capacitance of an electric double layer formed on the opposing surfaces of the positive electrode and the negative electrode.

The apparatus for manufacturing an electric double-layer capacitor electrode according to the first embodiment of the present invention includes a feeding roll (not shown) around which the collector foil 1 is wound, a winding roll 3 onto which the collector foil 1 fed from the feeding roll is reeled, and a pair of embossing rolls 4 which are provided between the feeding roll and the winding roll 3 in a manner that allows the embossing rolls 4 to press on both the front surface and rear surface of the collector foil 1. Each of the embossing rolls 4 has an embossing pattern 4a formed on its circumferential surface to form the grooves 1a running in one direction in the collector foil 1 by pressing on the collector foil 1.

The direction of the grooves 1a formed in the collector foil 1 by the embossing pattern 4a matches the moving direction of the collector foil 1, which moves from the feeding roll toward the winding roll 3. In other words, the longitudinal direction of the grooves 1a and the longitudinal direction of the collector foil 1 are the same. The direction of the grooves 1a formed in the collector foil 1 is not limited thereto and may be in other directions.

The grooves 1a are formed only in a middle portion of the collector foil 1 in a direction perpendicular to the moving direction from the feeding roll to the winding roll 3, whereas no grooves 1a are formed along both edges in the direction perpendicular to the moving direction. Ungrooved portions 1b of the collector foil 1 which are regions with no grooves 1a formed therein are used as collector terminal portions 5 when the collector foil 1 is assembled. A region indicated by a dot-dot-dash line in FIG. 1 represents the electric double-layer capacitor electrode after being cut into a given shape.

This manufacturing apparatus also includes applying means (not shown), which applies the electrode layer 2 containing the plurality of electrode particles 2a to the collection foil 1 where the grooves 1a have been formed, an electrode pressing roll 6, which presses the electrode layer 2 applied to the collector foil 1 toward the collector foil 1, and cutting means (not shown), which cuts the collector foil 1 and the electrode layer 2 into a given shape.

The electrode pressing roll 6 rotates in a manner that moves the electrode particles 2a that have come into contact with a rolling surface of the electrode pressing roll 6 along the grooves 1a. This causes the electrode particles 2a that have come into contact with the rolling surface of the electrode pressing roll 6 to roll over the front surface or rear surface of the collector foil 1 while being pressed by the electrode pressing roll 6, and work into the grooves 1a. The direction of the grooves 1a of the collector foil 1 and the direction in which the electrode particles 2a that have come into contact with the rolling surface of the electrode pressing roll 6 move do not necessarily match perfectly. For instance, the direction in which the electrode particles 2a that have come into contact with the rolling surface of the electrode pressing roll 6 move may be at an angle of approximately 45° with respect to the direction of the grooves 1a of the collector foil 1.

In the first embodiment of the present invention, the direction of the grooves 1a of the collector foil 1 and the direction in which the electrode particles 2a that have come into contact with the rolling surface of the electrode pressing roll 6 move match, and the electrode particles 2a worked into the grooves 1a are therefore pressed by the electrode pressing roll 6 for a long period of time. This allows the electrode particles 2a to dig into the grooves 1a even when the force with which the electrode pressing roll 6 presses the electrode particles 2a is lessened. As a result, the electrode particles 2a can dig into the grooves 1a while the breakage of the electrode particles 2a and the warping of the collector foil 1 are reduced.

Figure 4:
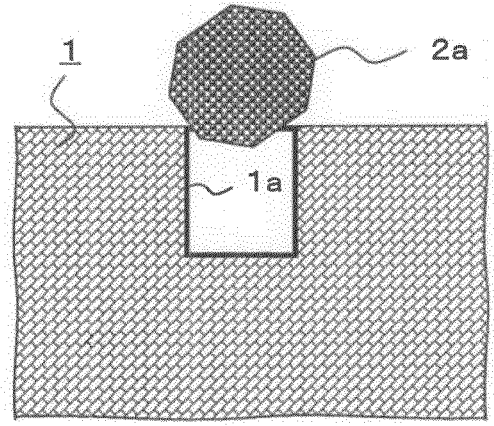
FIG. 4 A fragmentary sectional view taken along the line IV-IV of FIG. 3.
Figure 5:
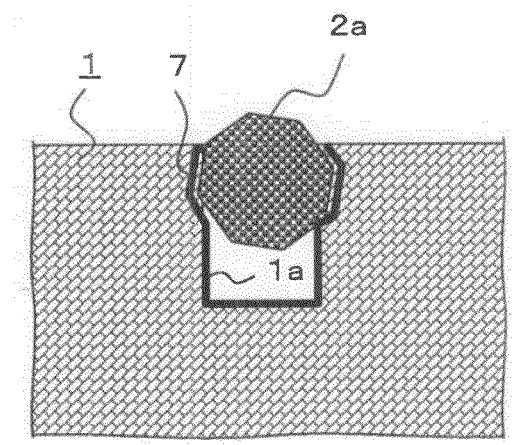
FIG. 5 A fragmentary sectional view taken along the line V-V of FIG. 3.

FIG. 4 is a fragmentary sectional view taken along the line IV-IV of FIG. 3. FIG. 5 is a fragmentary sectional view taken along the line V-V of FIG. 3. With the electrode particles 2a digging into the grooves 1a, contact portions 7 which are brought into a solid surface-to-surface contact with the electrode particles 2a are formed on side surfaces of the grooves 1a. The contact portions 7 which are brought into a surface-to-surface contact with the electrode particles 2a sandwich and hold fast the electrode particles 2a, thereby lowering the contact resistance between the collector foil 1 and the electrode layer 2. Even when distributed sparsely over the front surface and rear surface of the collector foil 1, the electrode particles 2a that are held in the grooves 1a of the collector foil 1 are capable of lowering the contact resistance between the collector foil 1 and the electrode layer 2 significantly. This is because of an anchor effect which lowers the contact resistance between the electrode particles 2a acting as anchors and the collector foil 1, and accordingly allows a large amount of current to flow between the collector foil 1 and the electrode layer 2 via the electrode particles 2a.

In the case where the grooves 1a formed in the collector foil 1 each have a circular shape when viewed from a direction perpendicular to the collector foil 1, the electrode particles 2a that have come into contact with the electrode pressing roll 6 may manage to work into the grooves 1a but have difficulties in digging into the grooves 1a because the electrode pressing roll 6 presses the electrode particles 2a for a shorter period of time. If the grooves 1a are larger in diameter than the electrode particles 2a, the electrode particles 2a merely work into the grooves 1a and do not dig into the grooves 1a, with the result that the contact between the electrode particles 2a and the grooves 1a remains a point contact. If the grooves 1a are smaller in diameter than the electrode particles 2a, the electrode particles 2a cannot work into the grooves 1a, and are consequently crushed by the pressing force of the electrode pressing roll 6 or bounced off the collector foil 1. The diameter of the electrode particles 2a and the diameter of the grooves 1a therefore need to match in the case where the grooves 1a formed in the collector foil 1 each have a circular shape when viewed from the direction perpendicular to the collector foil 1.

As described above, according to the method of manufacturing an electric double-layer capacitor electrode of the first embodiment of the present invention, the electrode layer 2 is pressed toward the collector foil 1 to make the electrode particles 2a dig into the grooves 1a formed in the collector foil 1, thereby obtaining an electric double-layer capacitor electrode that reduces the breakage of the electrode particles 2a and the warping of the collector foil 1 and that is lowered in internal resistance by lowering the contact resistance between the collector foil 1 and the electrode layer 2.

In addition, this manufacturing method has fewer steps than a conventional method of manufacturing an electric double-layer capacitor electrode, which involves applying conductive paste between the collector foil 1 and the electrode layer 2, by omitting a step of applying the conductive paste between the collector foil 1 and the electrode layer 2 and a step of drying the collector foil 1 and the electrode layer 2 after the conductive paste is applied, and can therefore improve efficiency in the manufacture of an electric double-layer capacitor electrode.

Further, according to this manufacturing method, the grooves 1a are formed to run in one direction and the electrode particles 2a are moved along the grooves 1a until the electrode particles 2a dig into the grooves 1a, the grooves 1a are therefore pressed by the electrode pressing roll 6 for a long period of time. The force with which the electrode pressing roll 6 presses the electrode particles 2a can accordingly be lessened and the breakage of the electrode particles 2a and the warping of the collector foil 1 can be reduced even more.

Further, according to this manufacturing method, the grooves 1a are formed by an embossing process, it is therefore easy to form the grooves 1a in the collector foil 1.

Further, according to this manufacturing method, the grooves 1a are formed in middle portions of the front surface and rear surface of the collector foil 1 in the width direction, portions along both edges in the width direction are therefore the ungrooved portions 1b with no grooves 1a formed therein, and the collector terminal portions 5 used when the collector foil 1 is assembled are thus formed easily.

The electric double-layer capacitor electrode according to the first embodiment of the present invention includes the collector foil 1, which has the grooves 1a formed on its front surface and rear surface, and an electrode layer 2, which is provided on each of the front surface and rear surface of the collector foil 1 and which includes the electrode particles 2a digging into the grooves 1a. The breakage of the electrode particles 2a and the warping of the collector foil 1 are thus reduced, and internal resistance is lowered by lowering the contact resistance between the collector foil 1 and the electrode layer 2.

The first embodiment described above discusses a method of manufacturing an electric double-layer capacitor electrode that uses the electrode pressing roll 6 to press the electrode layer 2 toward the collector foil 1. However, the present invention is not limited thereto and may also include a method of manufacturing an electric double-layer capacitor electrode that uses other means capable of pressing the electrode layer 2 to press the electrode layer 2 toward the collector foil 1.

Figure 6:
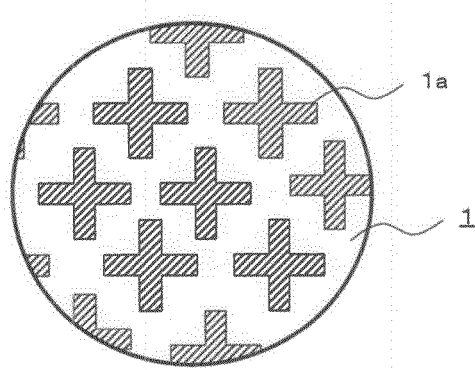
FIG. 6 A plan view illustrating a modified example of grooves in collector foil that are formed by the apparatus for manufacturing an electric double-layer capacitor electrode according to the first embodiment of the present invention.

The first embodiment described above discusses the grooves 1a formed in the collector foil 1 to run in one direction. However, the grooves 1a may be formed to have an elliptical shape or a wedge shape, for example. The grooves 1a may also be formed to have a cross shape when viewed from the direction perpendicular to the collector foil 1, as illustrated in FIG. 6. In this case, although the electrode particles 2a hardly work into regions within each of the grooves 1a that run in a direction at right angles with the moving direction of the electrode particles 2a that have come into contact with the rolling surface of the electrode pressing roll 6, the forming of the embossing pattern 4a is facilitated.

Second Embodiment

Figure 7:
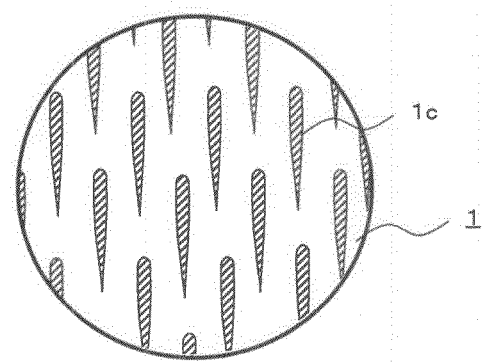
FIG. 7 A plan view illustrating an important portion of an electric double-layer capacitor electrode that is manufactured by an apparatus for manufacturing an electric double-layer capacitor electrode according to a second embodiment of the present invention.
Figure 8:
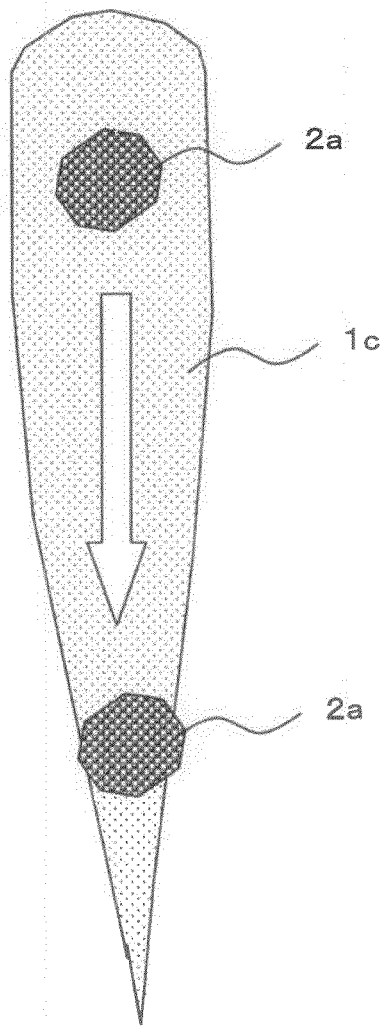
FIG. 8 A plan view illustrating a state in which an electrode particle has worked into a groove of FIG. 7.

FIG. 7 is a plan view illustrating an important portion of an electric double-layer capacitor electrode that is manufactured by an apparatus for manufacturing an electric double-layer capacitor electrode according to a second embodiment of the present invention. FIG. 8 is a plan view illustrating a state in which one of the electrode particles 2a has worked into one of grooves 1c of FIG. 7. In the electric double-layer capacitor electrode according to the second embodiment of the present invention, the grooves 1c are formed on each of the front surface and rear surface of the collector foil 1 which run in one direction and which are wider at one end than at the other end.

The moving direction of the electrode particles 2a that have come into contact with the rolling surface of the electrode pressing roll 6 and the direction of the grooves 1c match, and the electrode particles 2a are pressed by the electrode pressing roll 6 to move from the one end of the grooves 1c toward the other end of the grooves 1c. This makes it easy for the electrode particles 2a to enter the grooves 1c. The electrode particles 2a that have entered the grooves 1c are trapped by the electrode pressing roll 6, and are moved toward the other end of the grooves 1c, namely, the end where the width is narrower, by the rotation of the electrode pressing roll 6 to be held in the grooves 1c.

As described above, according to the method of manufacturing an electric double-layer capacitor electrode of the second embodiment of the present invention, the grooves 1c of the collector foil 1 are formed to be wider at one end than at the other end and the electrode particles 2a are moved from the one end of the grooves 1c toward the other end of the grooves 1c, putting the electrode particles 2a in the grooves 1c is therefore easy and the electrode particles 2a readily dig into the grooves 1c.

The electric double-layer capacitor electrode according to the second embodiment of the present invention includes the collector foil 1, which has the grooves 1c formed on its surfaces to run in one direction and to be wider at one end than the other end, and the electrode layer 2, which is provided on each of the surfaces of the collector foil 1 and which includes the electrode particles 2a digging into the other end of the grooves 1c. The electrode particles 2a are thus held fast in the grooves 1c. This lowers the contact resistance between the collector foil 1 and the electrode layer 2 even more.

Figure 9:
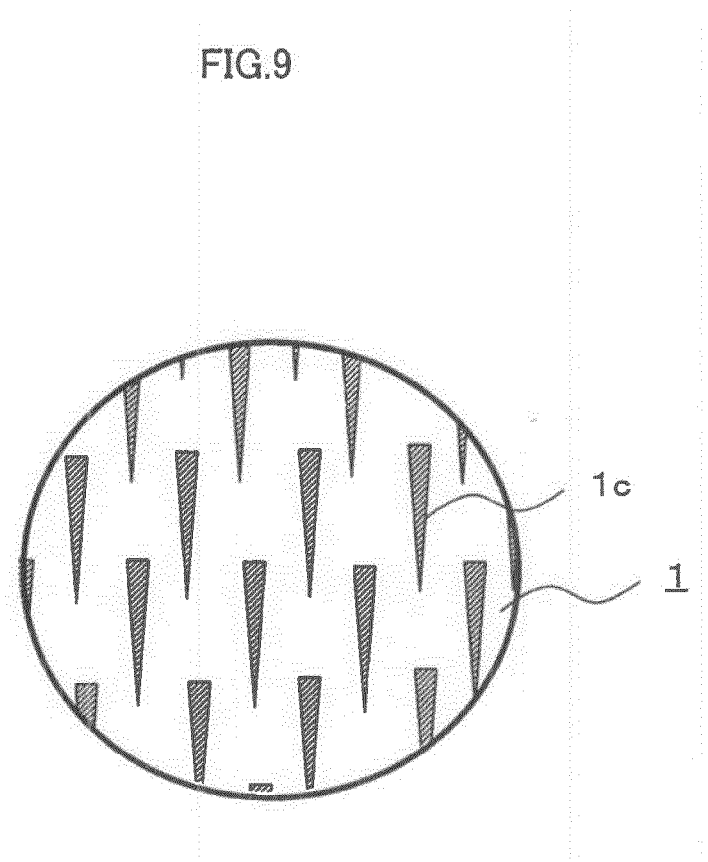
FIG. 9 A plan view illustrating a modified example of the groove of FIG. 7.

The second embodiment described above discusses a structure in which, as illustrated in FIG. 7, the inner walls of the grooves 1c at the wider end (the one end) have an arc shape when the grooves 1c are viewed from the direction perpendicular to the collector foil 1. Alternatively, a structure illustrated in FIG. 9, for example, may be employed in which the inner walls of the grooves 1c have a wedge shape when the grooves 1c are viewed from the direction perpendicular to the collector foil 1. In short, the grooves 1c only need to be wider at one end than at the other end. This makes it easy for the electrode particles 2a to work into the grooves 1c. In addition, when pressed by the roll, the electrode particles 2a move by rolling or sliding within the grooves 1c until stuck in the narrow portions (the other end) of the grooves 1c, and push apart the side surfaces of the grooves 1c or stretch the bottom surfaces of the grooves 1c, thereby turning the contact between the electrode particles 2a and the collector foil 1 into a surface-to-surface contact from a point contact.

Third Embodiment

Figure 10:
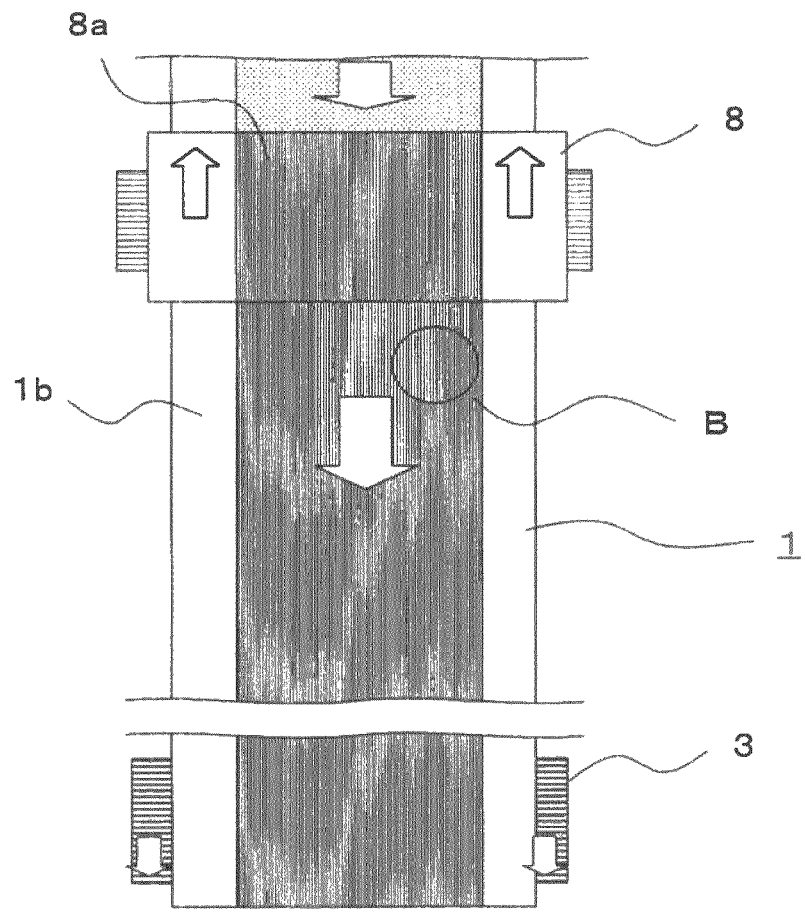
FIG. 10 A plan view illustrating an important portion of an apparatus for manufacturing an electric double-layer capacitor electrode according to a third embodiment of the present invention.
Figure 11:
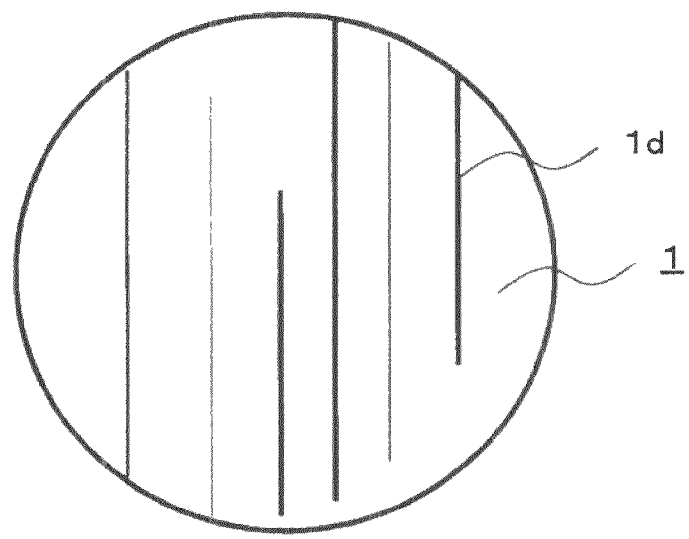
FIG. 11 An enlarged view of a portion B of FIG. 10.

FIG. 10 is a plan view illustrating an important portion of an apparatus for manufacturing an electric double-layer capacitor electrode according to this embodiment. FIG. 11 is an enlarged view of a portion B of FIG. 10. The apparatus for manufacturing an electric double-layer capacitor electrode according to a third embodiment of the present invention includes a pair of rollers 8 around which pieces of sandpaper 8a are respectively wrapped, in place of the embossing rolls 4 described in the first embodiment.

The rollers 8 press the front surface and rear surface of the collector foil 1 with a force smaller than the force with which the embossing rolls 4 press the collector foil 1 in the first embodiment. The rollers 8 also rotate with portions of the rollers 8 that are brought into contact with the collector foil 1 sliding over the front surface and rear surface of the collector foil 1. In other words, the rollers 8 roll over the front surface and rear surface of the collector foil 1 at a speed slower or faster than the moving speed of the collector foil 1. This forms elongated grooves 1d along the moving direction of the collector foil 1 on the front surface and rear surface of the collector foil 1.

The width of each of the grooves 1d can be adjusted by the grit size of the sandpaper 8a, i.e., the size of the abrasive grain of the sandpaper 8a. Therefore, the grit size of the sandpaper 8a that is suited to the size of the electrode particles 2a used in the electrode layer 2 only needs to be chosen. The abrasive grain of the sandpaper 8a is smaller when the grit size number is larger.

Because only the grooves 1d running in the moving direction of the collector foil 1 are formed, accidental cutting of the collector foil 1 in a direction that separates the feeding roll side and the side of the winding roll 3 is reduced even when, for example, the grooves 1d are formed too deep. In addition, the tensile strength of the collector foil 1 is maintained by the ungrooved portions 1b, thereby reducing manufacture process problems in steps subsequent to a groove forming step in which the grooves 1d are formed in the collector foil 1, such as an electrode layer pressing step in which the electrode pressing roll 6 presses the electrode layer 2 toward the collector foil 1 and a cutting step in which the collector foil 1 with the electrode particles 2a of the electrode layer 2 digging into is cut into a given shape.

Described next is the contact resistance between the collector foil 1 and the electrode layer 2 in an electric double-layer capacitor electrode that is manufactured by the apparatus for manufacturing an electric double-layer capacitor electrode according to the third embodiment of the present invention.

The inventors of the present invention actually measured the internal resistance of an electric double-layer capacitor electrode that was manufactured by the apparatus for manufacturing an electric double-layer capacitor electrode according to the third embodiment of the present invention. A manufacturing method of Example 1 in which this apparatus for manufacturing an electric double-layer capacitor electrode performed manufacturing is described first. Five sheets of collector foil 1 which were each 50 µm in thickness, 100 mm in width, and 300 mm in length were prepared and sanded twice with the use of pieces of sandpaper 8a which had grit sizes of #400, #800, #1000, #1500, and #2000 to produce five types of collector foil 1.

Thereafter, water-based paste in which steam-activated carbon was mixed as the electrode particles 2a having a mean particle size of 4.5 µm was applied to each type of collector foil 1 to form the electrode layer 2, and the collector foil 1 and the electrode layer 2 were dried. After the collector foil 1 and the electrode layer 2 were dried, the electrode pressing roll 6 was used to press the electrode layer 2 toward the collector foil 1 at a pressure of 0.2 t/cm, thereby causing the electrode particles 2 to dig into the grooves 1d. The thickness of the electrode minus the collector foil 1 after the collector foil 1 and the electrode layer 2 were pressed was 20 µm.

Figure 12:
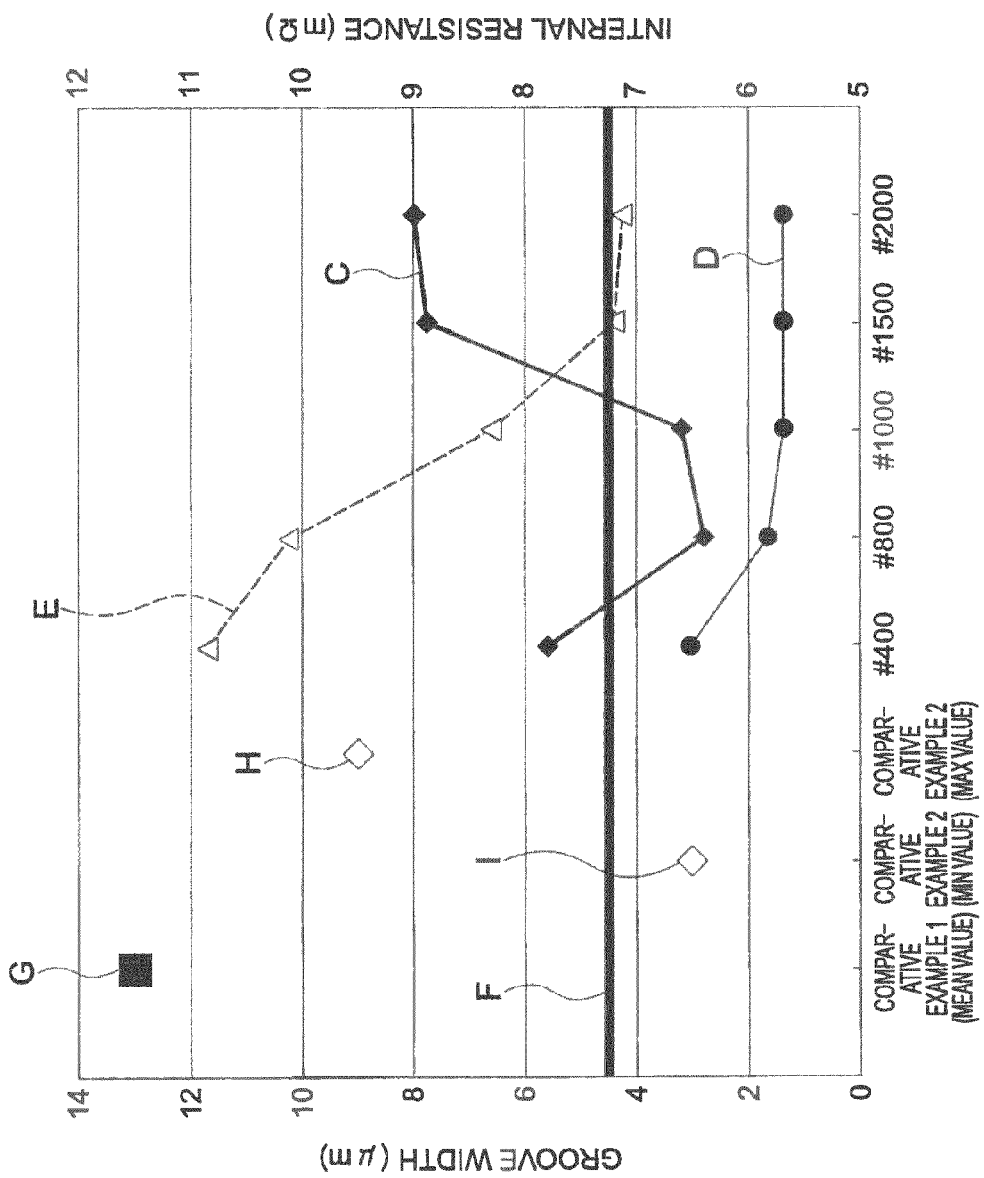
FIG. 12 A graph showing results of measuring internal resistance and the like in an electric double-layer capacitor electrode of FIG. 10.

Each electric double-layer capacitor electrode was then cut into five strips which were respectively sandwiched by copper sheets plated with gold, and a pressure of 3.75 MPa was applied to measure the internal resistance of each electric double-layer capacitor electrode. A graph line C of FIG. 12 represents the respective mean internal resistance values of the five types of electric double-layer capacitor electrodes.

The inventors of the present invention also used a stereomicroscope to measure the groove width and groove depth of the grooves 1d in the five types of electric double-layer capacitor electrodes manufactured by the manufacturing method described above. In FIG. 12, a graph line D represents the minimum groove width value of the grooves 1d in each electric double-layer capacitor electrode, and a graph line E represents the mean groove width value of the grooves 1d in each electric double-layer capacitor electrode. A graph line F represents the mean particle size of the electrode particles 2a. Although the groove depth in each electric double-layer capacitor electrode is not shown in FIG. 12, the maximum value and mean value of the groove depth were 4 µm and 1.4 µm, respectively, when the sandpaper 8a having a grit size of #400 was used to form the grooves 1d, whereas the maximum value and mean value of the groove depth were 0.8 µm and 0.2 µm, respectively, when the sandpaper 8a having a grit size of #2000 was used to form the grooves 1d. In short, the groove depth was shallower when the grit size number was larger, in other words, when the size of abrasive grain was smaller.

For comparison to the internal resistance of Example 1, the inventors of the present invention measured the internal resistance of Comparative Example 1, in which manufacturing was performed by another manufacturing method, and the internal resistance of Comparative Example 2, in which manufacturing was performed by still another manufacturing method. A manufacturing method of Comparative Example 1 is described first. The collector foil 1 having a thickness of 50 μm, a width of 100 mm, and a length of 300 mm which had not been subjected to an edging process was prepared, and water-based paste in which steam-activated carbon was mixed as the electrode particles 2a having a mean particle size of 4.5 μm was applied to the collector foil 1 to form the electrode layer 2. The collector foil 1 and the electrode layer 2 were then dried.

Thereafter, the electrode pressing roll 6 was used to press the electrode layer 2 toward the collector foil 1 at a pressure of 0.2 t/cm, which is approximately the same magnitude as in Example 1, to press the electrode particles 2a into the front surface and rear surface of the collector foil 1. The thickness of the electrode minus the collector foil 1 after the collector foil 1 and the electrode layer 2 were pressed was 20 μm. This electric double-layer capacitor electrode was cut into five strips which were respectively sandwiched by copper sheets plated with gold, and a pressure of 3.75 MPa was applied to measure the internal resistance of Comparative Example 1. A graph point G of FIG. 12 represents the mean internal resistance value of Comparative Example 1.

A manufacturing method of Comparative Example 2 is described next. The collector foil 1 having a thickness of 50 μm, a width of 100 mm, and a length of 300 mm which had not been subjected to an edging process was prepared, and water-based paste in which steam-activated carbon was mixed as the electrode particles 2a having a mean particle size of 4.5 μm was applied to the collector foil 1 to form the electrode layer 2. The collector foil 1 and the electrode layer 2 were then dried.

Thereafter, the electrode pressing roll 6 was used to press the electrode layer 2 toward the collector foil 1 at a pressure of 1.0 t/cm, which is approximately five times the magnitude as in Example 1 and as in Comparative Example 1, to press the electrode particles 2a into the collector foil 1. The thickness of the electrode minus the collector foil 1 after the collector foil 1 and the electrode layer 2 were pressed was 20 μm. This electric double-layer capacitor electrode was cut into five strips which were respectively sandwiched by copper sheets plated with gold, and a pressure of 3.75 MPa was applied to measure the internal resistance of Comparative Example 2. In FIG. 12, a graph point H represents the maximum value of the internal resistance of Comparative Example 2, and a graph point I represents the minimum value of the internal resistance of Comparative Example 2.

As shown in FIG. 12, the internal resistance of Example 1 is lower than the internal resistance of Comparative Example 1. It is surmised that the electric double-layer capacitor electrode of Comparative Example 1, where the front surface and rear surface of the collector foil 1 made of aluminum are covered with oxide films, is large in internal resistance because the electrode particles 2a come into contact with the collector foil 1 through the oxide films and the contact of the electrode particles 2a with the collector foil 1 is a point contact, which increase the contact resistance between the collector foil 1 and the electrode particles 2.

The internal resistance of Comparative Example 2 has a large standard deviation as shown in FIG. 12. On the other hand, the internal resistance of Example 1 and the internal resistance of Comparative Example 2, though not shown in FIG. 12, were smaller in standard deviation than the internal resistance of Comparative Example 2. A possible cause is that, in the electric double-layer capacitor electrode of Comparative Example 2, the electrode pressing roll was used to press the electrode layer 2 toward the collector foil 1 at a pressure five times larger than in Example 1 and Comparative Example 1, the electrode particles 2a therefore dug into the grooves 1a in some regions but were crushed and broken, or bounced out of the grooves 1d, in other regions.

In the electric double-layer capacitor electrodes of Example 1, the internal resistance between the collector foil 1 and the electrode layer 2 was minimum when the grit size of the sandpaper 8a was #800 and #1000, and the internal resistance between the collector foil 1 and the electrode layer 2 increased therefrom when the grit size of the sandpaper 8a was #1500 and #2000. In the electric double-layer capacitor electrodes of Example 1, the mean groove width of the grooves 1d was smaller than the mean particle size of the electrode particles 2a when the grit size was #1500 and #2000. The internal resistance between the collector foil 1 and the electrode layer 2 increased probably because the number of electrode particles 2a that had dug into the grooves 1d decreased when the mean groove width of the grooves 1d became smaller than the mean particle size of the electrode particles 2a. It is found from the above that the internal resistance between the collector foil 1 and the electrode layer 2 is small when the mean particle size of the electrode particles 2a is larger than the minimum groove width value of the grooves 1d and smaller than the mean groove width of the grooves 1d.

Described next is the internal resistance of an electric double-layer capacitor obtained when the moving direction of the electrode particles 2a that have come into contact with the rolling surface of the electrode pressing roll 6 does not match the direction of the grooves 1d of the collector foil 1. The inventors of the present invention actually measured the internal resistance of an electric double-layer capacitor electrode when the moving direction of the electrode particles 2a that have come into contact with the rolling surface of the electrode pressing roll 6 was orthogonal to the direction of the grooves 1d of the collector foil 1 in the apparatus for manufacturing an electric double-layer capacitor electrode according to this embodiment. A manufacturing method of Example 2 is described first in which manufacturing was performed with the use of this apparatus for manufacturing an electric double-layer capacitor electrode by setting the moving direction of the electrode particles 2a that have come into contact with the rolling surface of the electrode pressing roll 6 orthogonal to the direction of the grooves 1d of the collector foil 1. Five sheets of collector foil 1 which were each 50 μm in thickness, 100 mm in width, and 300 mm in length were prepared and sanded twice in one direction and then once in the other direction orthogonal to the one direction with the use of pieces of sandpaper 8a which had grit sizes of #400, #800, #1000, #1500, and #2000 to produce five types of collector foil 1. The rest of the procedure is the same as in the method of manufacturing an electric double-layer capacitor electrode of Example 1. Measurement results, though not shown, exhibited the same tendency as that of the measurement results of Example 1. In other words, the internal resistance of an electric double-layer capacitor electrode was found to be unaffected by the fact that the moving direction of the electrode particles 2a that have come into contact with the rolling surface of the electrode pressing roll 6 was orthogonal to the direction of the grooves 1d of the collector foil 1. This is probably because the electrode particles 2 have difficulties in digging into the grooves 1d that are formed to run in a direction orthogonal to the moving direction of the electrode particles 2a at the time the collector foil 1 and the electrode layer 2 are pressed by the electrode pressing roll 6.

In order to derive the relation of the internal resistance of an electric double-layer capacitor with the collector foil 1 and the electrode particles 2a, the inventors of the present invention next used a stereomicroscope to observe the electrode particles 2a that dug into the grooves 1d of the collector foil 1, or the electrode particles 2a that were pressed into the collector foil 1, after washing all the electric double-layer capacitor electrodes of Example 1, Example 2, Comparative Example 1, and Comparative Example 2 with water and thus removing the electrode layer 2 from the collector foil 1. No electrode particles 2a at all were left in the front surface and rear surface of the collector foil 1 of Comparative Example 1. Of the samples of Comparative Example 2, many electrode particles 2a were pressed into the collector foil 1 that had the minimum value of the internal resistance between the collector foil 1 and the electrode layer 2, whereas a few electrode particles 2a were pressed into the collector foil 1 that had the maximum value of the internal resistance between the collector foil 1 and the electrode layer 2. Of the samples of Example 1 and Example 2, many electrode particles 2a dug into the grooves 1d of the collector foil 1 for which the grit size was #800 or #1000. In particular, it was found that the electrode particles 2a were held in the grooves 1d whose groove width was narrower than the diameter of the electrode particles 2a. Of the samples of Example 1 and Example 2, a few electrode particles 2a dug into the grooves 1d of the collector foil 1 for which the grit size was #1500 or #2000, and the number of electrode particles 2a that dug into the grooves 1d of the collector foil 1 for which the grit size was #400 was smaller than in the grooves 1d of the collector foil 1 for which the grit size was #800 or #1000. In the case of Example 2, substantially no electrode particles 2a dug into the grooves 1d that were formed to run in a direction orthogonal to the moving direction of the electrode particles 2a that have come into contact with the rolling surface of the electrode pressing roll 6. It is clear from the above that the electrode particles 2a held in the grooves 1d of the collector foil 1 act as anchors and contribute to the lowering of the internal resistance of the electric double-layer capacitor electrode.

As described above, according to the method of manufacturing an electric double-layer capacitor electrode of the third embodiment of the present invention, the grooves 1d are formed in the front surface and rear surface of the collector foil 1 by sanding with the sandpaper 8a, the grooves 1d can therefore be formed in the front surface and rear surface of the collector foil 1 by a simple method. In addition, compared to the case where the grooves 1d are formed in the collector foil 1 by the embossing pattern 4a, the groove width of the grooves 1d can easily be narrowed and the electrode particles 2a that have a small particle size therefore readily dig into the grooves 1d.

Further, because the grooves 1d are formed in a manner that makes the minimum width value of the grooves 1d smaller than the mean particle size of the electrode particles 2a and the mean width value of the grooves 1d larger than the mean particle size of the electrode particles 2a, the electrode particles 2a effectively dig into the grooves 1d.

The third embodiment describes the method of manufacturing an electric double-layer capacitor electrode that uses sanding with the sandpaper 8a to form the grooves 1d in the front surface and rear surface of the collector foil 1. However, the present invention is not limited thereto and may also include a method of manufacturing an electric double-layer capacitor electrode that uses, for example, a hairline surface polishing machine to form the grooves 1d in the front surface and rear surface of the collector foil 1. The hairline surface polishing machine is, for example, one that is used to improve the design of stainless piece by forming extremely fine scratches on a stainless surface, and can be used to form the grooves 1d in at least one of the front surface and rear surface of the collector foil 1.

The embodiments described above take an electric double-layer capacitor electrode as an example of an energy storage device electrode. However, the energy storage device electrode is not limited thereto and may also be, for example, a lithium ion capacitor electrode or a lithium ion battery electrode. In the case of a lithium ion capacitor electrode and a lithium ion battery electrode, the collector foil 1 of the positive electrode is made from a film of aluminum formed to a thickness of 15 μm to 50 μm, and the collector foil 1 of the negative electrode is made from a film of copper formed to a thickness of 10 μm to 20 μm. A lithium ion capacitor electrode uses activated carbon particles as the electrode particles 2a in the positive electrode and carbon particles that occlude lithium such as graphite as the electrode particles 2a in the negative electrode. The former and latter electrode particles 2a desirably have a diameter of several μm to several tens p.m. A lithium ion battery electrode uses a lithium compound of a cobalt oxide, a nickel oxide, a manganese oxide, or a similar oxide, or uses olivine-type iron phosphate or the like, as the electrode particles 2a in the positive electrode, and uses carbon particles that occlude lithium such as graphite as the electrode particles 2a in the negative electrode. The former and latter electrode particles 2a desirably have a diameter of several μm to several tens μm. A lithium ion capacitor is produced by doping an electric double-layer capacitor electrode that has a negative voltage with lithium ions, and can obtain a higher upper-limit voltage than that of an electric double-layer capacitor. A lithium ion battery is capable of stably filling the negative electrode with lithium for storage.

Fourth Embodiment

Figure 13:
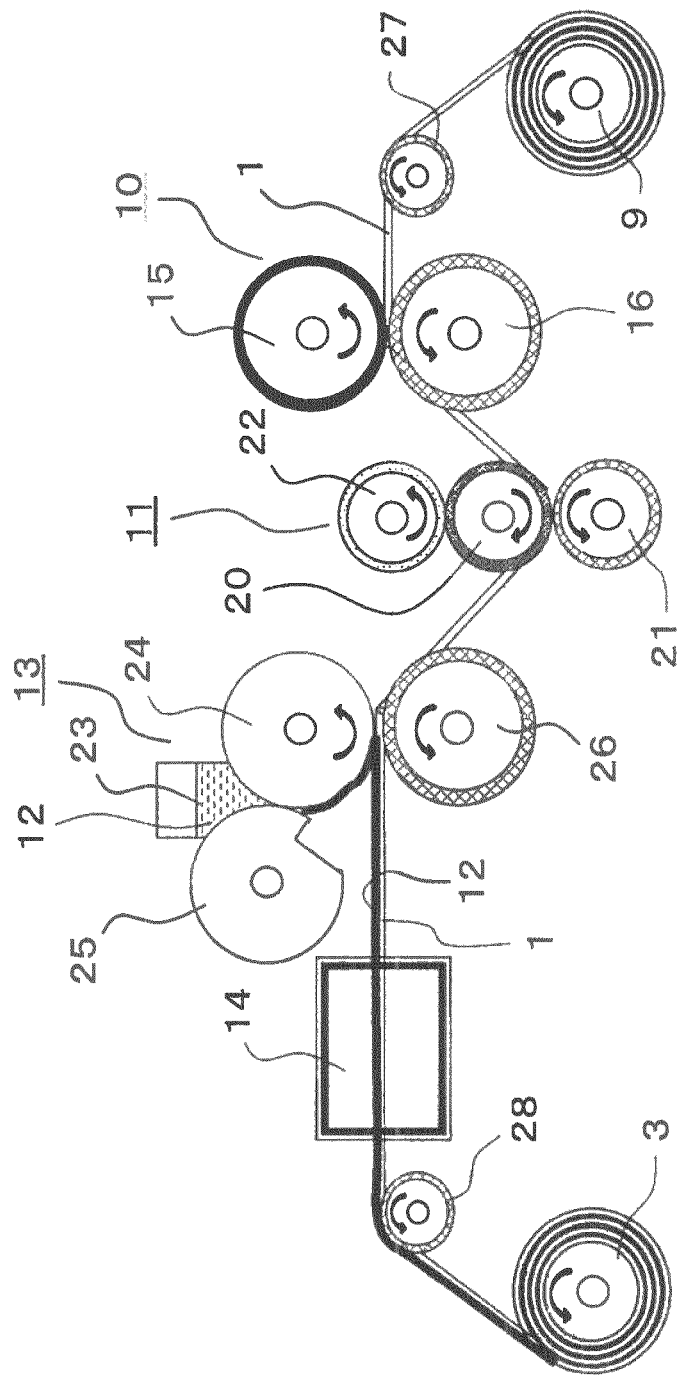
FIG. 13 A side view illustrating an apparatus for manufacturing an energy storage device electrode according to a fourth embodiment of the present invention.

FIG. 13 is a side view illustrating an apparatus for manufacturing an energy storage device electrode according to a fourth embodiment of the present invention. In the figure, the collector foil 1 is fed from a feeding roll 9. The collector foil 1 fed from the feeding roll 9 is reeled onto the winding roll 3. Provided along the moving path of the collector foil 1 from the feeding roll 9 to the winding roll 3 are a groove forming device 10, which forms grooves in the collector foil 1, a metal dust removing device 11, which removes from the collector foil 1 metal dust (foreign material) generated by forming the grooves in the collector foil 1, an electrode paste applying device 13, which applies electrode paste (electrode layers) 12 to the collector foil 1, and a drying furnace 14, which dries the electrode paste 12 applied to the collector foil 1.

The groove forming device 10 includes a groove forming roll 15, which has a circumferential surface brought into contact with the front surface of the collector foil 1, and a back roll 16, which has a circumferential surface brought into contact with the rear surface of the collector foil 1. The groove forming roll 15 and the back roll 16 are arranged so as to have the same axis line direction. The collector foil 1 enters the groove forming device 10 to be sandwiched between the groove forming roll 15 and the back roll 16. The driving force of a driving device (not shown) is transmitted to the groove forming roll 15 and the back roll 16. The groove forming roll 15 and the back roll 16 are rotated by the driving force of the driving device. The rotation direction of the groove forming roll 15 is in a direction that goes against a turning force generated in the groove forming roll 15 by the movement of the collector foil 1 when the collector foil 1 moves from the feeding roll 9 to the winding roll 3. The groove forming roll 15 therefore rotates while sliding against the collector foil 1. The back roll 16 rotates in a manner that moves the collector foil 1 from the feeding roll 9 to the winding roll 3.

Figure 14:
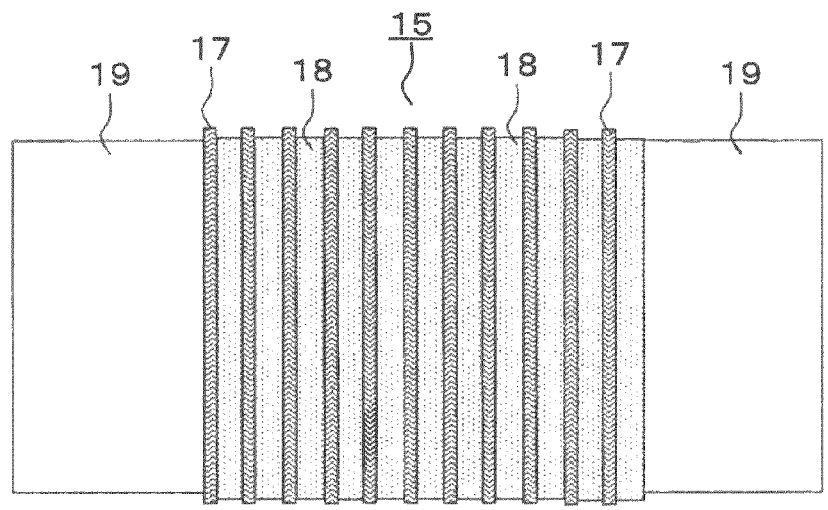
FIG. 14 A plan view illustrating a groove forming roll of FIG. 13.

FIG. 14 is a plan view illustrating the groove forming roll 15 of FIG. 13. In the figure, the groove forming roll 15 has a plurality of toothed-edge disks 17, a plurality of smooth-edge disks 18, and a pair of end portions 19. The toothed-edge disks 17 and the smooth-edge disks 18 are stacked alternately. The toothed-edge disks 17 and the smooth-edge disks 18 are arranged about the same axis. The end portions 19 are disposed to overlap with two end portions of a stack of the toothed-edge disks 17 and the smooth-edge disks 18 in the stacking direction.

Figure 15:
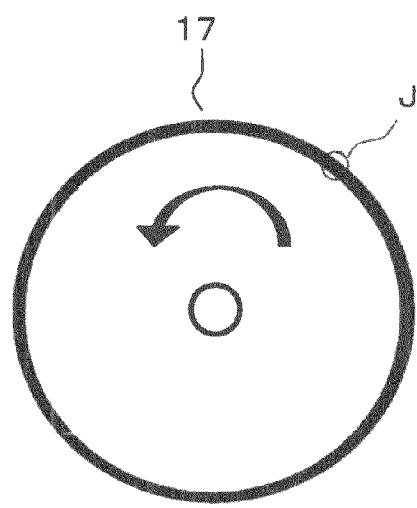
FIG. 15 A side view illustrating a toothed-edge disk of FIG. 14.
Figure 16:
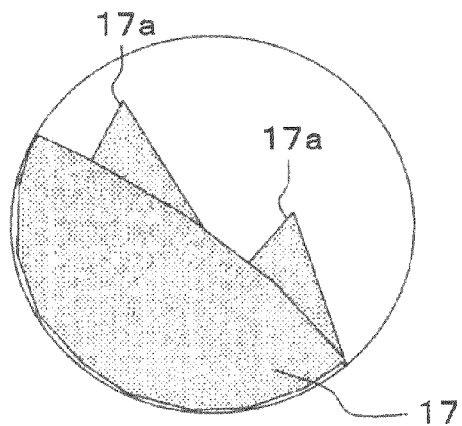
FIG. 16 An enlarged view of a portion J of FIG. 15.
Figure 17:
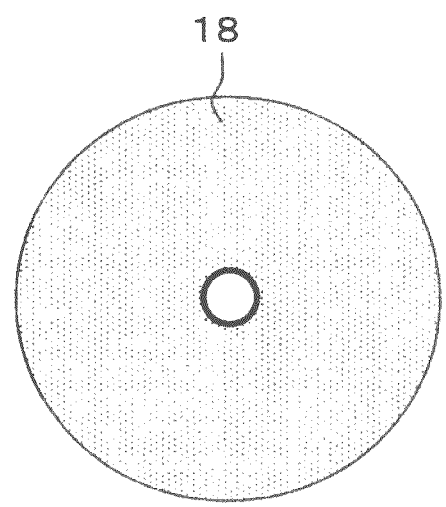
FIG. 17 A side view illustrating a smooth-edge disk of FIG. 14.

FIG. 15 is a side view of the toothed-edge disks 17 of FIG. 14. FIG. 16 is an enlarged view of a portion J of FIG. 15. FIG. 17 is a side view of the smooth-edge disks 18 of FIG. 14. A plurality of projections 17a are formed on a circumferential surface of each of the toothed-edge disks 17. The projections 17a are formed by wire cutting or electric discharge machining. The smooth-edge disks 18 each have a smoothly formed circumferential surface. When the groove forming roll 15 is viewed from the axis line direction of the groove forming roll 15, the tips of the projections 17a protrude outward in the radial direction from the circumferential surfaces of the smooth-edge disks 18. In this manner, a plurality of grooves running in the longitudinal direction (one direction) of the collector foil 1 are formed by rotating the groove forming roll 15 while the groove forming roll 15 is in contact with the collector foil 1.

The metal dust removing device 11 is disposed such that a portion of the collector foil 1 that has passed through the groove forming device 10 enters the metal dust removing device 11 as illustrated in FIG. 13. The metal dust removing device 11 includes a metal dust removing roll 20, which has a circumferential surface brought into contact with the front surface of the collector foil 1, a back roll 21, which has a circumferential surface brought into contact with the rear surface of the collector foil 1, and a cleaning roll 22, which has a circumferential surface brought into contact with the circumferential surface of the metal dust removing roll 20. The metal dust removing roll 20, the back roll 21, and the cleaning roll 22 are arranged so as to have the same axis line direction. A driving force of a driving device (not shown) is transmitted to the metal dust removing roll 20, the back roll 21, and the cleaning roll 22.

The collector foil 1 enters the metal dust removing device 11 to be sandwiched between the metal dust removing roll 20 and the back roll 21. The metal dust removing roll 20 is rotated by the driving force of the driving device while in contact with the front surface of the collector foil 1. This removes metal dust (foreign material) adhered to the front surface of the collector foil 1 that has passed through the groove forming device 10. A portion of the metal dust removed from the front surface of the collector foil 1 adheres to the circumferential surface of the metal dust removing roll 20. The back roll 21 is rotated by the driving force of the driving device in a manner that moves the collector foil 1 from the feeding roll 9 to the winding roll 3. The cleaning roll 22 is rotated by the driving force of the driving device while in contact with the circumferential surface of the metal dust removing roll 20. The metal dust adhered to the circumferential surface of the metal dust removing roll 20 is removed from the metal dust removing roll 20 by the rotation of the cleaning roll 22.

The electrode paste applying device 13 is disposed such that a portion of the collector foil 1 that has passed through the metal dust removing device 11 enters the electrode paste applying device 13. The electrode paste applying device 13 includes a paste dam, which stores the electrode paste 12, a coating roll 24, which has a circumferential surface to which the electrode paste 12 taken out of the paste dam 23 adheres, a doctor roll 25, which adjusts the amount of the electrode paste 12 adhered to the coating roll 24, and a back roll 26, which has a circumferential surface brought into contact with the rear surface of the collector foil 1. The doctor roll 25, the coating roll 24, and the back roll 26 are arranged so as to have the same axis line direction. A driving force of a driving device (not shown) is transmitted to the doctor roll 25, the coating roll 24, and the back roll 26.

The collector foil 1 enters the electrode paste applying device 13 to be sandwiched between the coating roll 24 and the back roll 26. The coating roll 24 is a reverse roll. The electrode paste applying device 13 is a reverse roll coater. The back roll 26 is rotated by the driving force of the driving device in a manner that moves the collector foil 1 from the feeding roll 9 to the winding roll 3. The thickness of a layer of the electrode paste applied to the front surface of the collector foil 1 is determined by a speed ratio, which is the ratio of the number of revolutions of the coating roll 24 and the number of revolutions of the back roll 26.

The drying furnace 14 is disposed such that a portion of the collector foil 1 that has passed through the electrode paste applying device 13 enters the drying furnace 14. The solvent of the electrode paste 12 applied to the front surface of the collector foil 1 is vaporized in the drying furnace 14 and removed from the collector foil 1. A portion of the collector foil 1 that has passed through the drying furnace 14 is reeled onto the winding roll 3.

A guide roller 27 which guides the collector foil 1 is provided between the feeding roll 9 and the groove forming device 10. A guide roller 28 which guides the collector foil 1 is provided between the drying furnace 14 and the winding roll 3.

In the case where the energy storage device electrode is used as an electrode of an electric double-layer capacitor, the positive electrode of a lithium ion capacitor, or the positive electrode of a lithium ion battery, aluminum foil is used as the collector foil 1. In the case where the energy storage device electrode is used as the negative electrode of a lithium ion capacitor or the negative electrode of a lithium ion battery, copper foil is used as the collector foil 1.

When aluminum foil is used as the collector foil 1, a thin oxide coat is formed on a groove surface in as short a period of time as a few hours after the forming of grooves in the collector foil 1. With the passage of time, the oxide coat grows in thickness, thereby increasing the contact resistance between electrode particles of the electrode layer and the collector foil. It is therefore ideal to bury the electrode particles in the grooves as soon as possible after the grooves are formed in the collector foil 1. The rest of the structure is the same as in the first embodiment.

As described above, according to the method of manufacturing an energy storage device electrode of the fourth embodiment of the present invention, grooves are formed in the front surface of the collector foil 1 by rotating the groove forming roll 15, which has the plurality of projections 17a on its circumferential surface, in a direction that goes against a turning force generated in the groove forming roll 15 by the movement of the collector foil 1, while keeping the groove forming roll 15 in contact with the front surface of the collector foil 1 and moving the collector foil 1 in the longitudinal direction of the collector foil 1. The grooves are therefore easily formed in the front surface of the collector foil 1.

In addition, because the groove forming roll 15 is constructed by stacking alternately the plurality of toothed-edge disks 17, each of which has the plurality of projections 17a on its circumferential surface, and the plurality of smooth-edge disks 18, each of which has the smoothly formed circumferential surface, the distance between grooves that are adjacent to each other in the width direction of the collector foil 1 can be adjusted by changing the thickness of each of the smooth-edge disks 18. This also allows to limit the forming of grooves to the middle portion in the width direction of the collector foil 1. With no grooves formed in portions of the collector foil 1 along the edges in the width direction, the portions of the collector foil 1 along the edges in the width direction can be utilized as collector terminal portions. If grooves are formed in a collector terminal portion, the collector terminal portion is prone to breakage and the welding of the collector terminal portion by ultrasonic welding is difficult.

Further, according to this manufacturing method, after grooves are formed in the front surface of the collector foil 1, the electrode layer is applied to the front surface, and then the collector foil 1 is reeled, energy storage device electrodes can be thus manufactured in succession.

Moreover, after the grooves are formed in the front surface of the collector foil 1, metal dust adhered to the front surface of the collector foil 1 is removed, the electrode layer is subsequently applied to the front surface, and then the collector foil 1 is reeled. An increase in the contact resistance between the collector foil 1 and the electrode layer due to metal dust sandwiched between the collector foil 1 and the electrode layer is thus prevented.

The fourth embodiment described above discusses the method of manufacturing an energy storage device electrode in which the collector foil 1 passes through the metal dust removing device 11 at a point that follows the passing of the collector foil 1 through the groove forming device 10 and that precedes the entrance of the collector foil 1 to the electrode paste applying device 13. However, the collector foil 1 does not need to pass through the metal dust removing device 11 in the case where metal dust is not generated during the forming of grooves in the collector foil 1. This way, the manufacturing process of the collector foil 1 is simplified.

Fifth Embodiment

Figure 18:
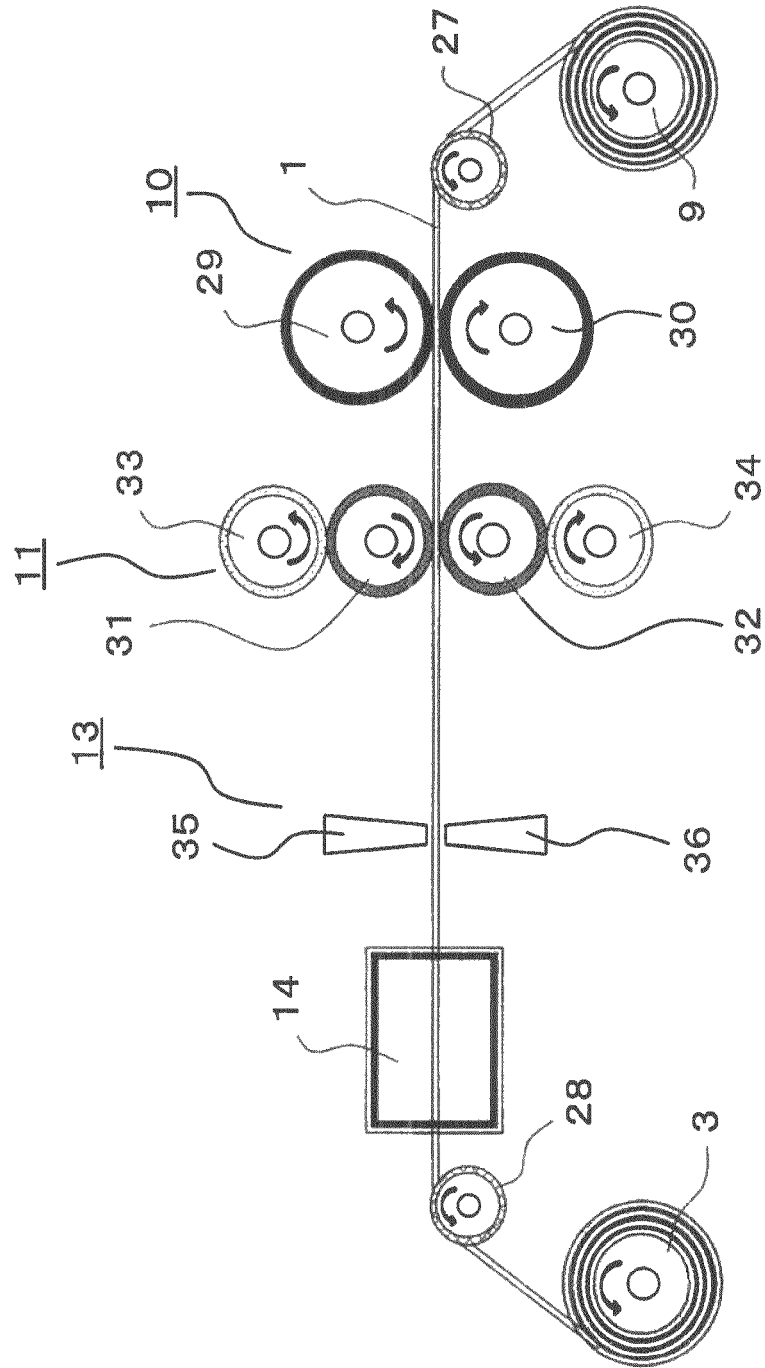
FIG. 18 A side view illustrating an apparatus for manufacturing an energy storage device electrode according to a fifth embodiment of the present invention.

FIG. 18 is a side view illustrating an apparatus for manufacturing an energy storage device electrode according to a fifth embodiment of the present invention. In the figure, the groove forming device 10 includes a first groove forming roll 29, which has a circumferential surface brought into contact with the front surface of the collector foil 1, and a second groove forming roll 30, which has a circumferential surface brought into contact with the rear surface of the collector foil 1. The first groove forming roll 29 and the second groove forming roll 30 are arranged so as to have the same axis line direction. The collector foil 1 enters the groove forming device 10 to be sandwiched between the first groove forming roll 29 and the second groove forming roll 30.

A driving force of a driving device (not shown) is transmitted to the first groove forming roll 29 and the second groove forming roll 30. The first groove forming roll 29 and the second groove forming roll 30 are rotated by the driving force of the driving device. The rotation directions of the first groove forming roll 29 and the second groove forming roll 30 are in directions that go against turning forces respectively generated by the movement of the collector foil 1 in the first groove forming roll 29 and the second groove forming roll 30, which are in contact with the collector foil 1 when the collector foil 1 moves from the feeding roll 9 to the winding roll 3. The first groove forming roll 29 and the second groove forming roll 30 therefore rotate while sliding against the collector foil 1.

The metal dust removing device 11 includes a first metal dust removing roll 31, which has a circumferential surface brought into contact with the front surface of the collector foil 1, a second metal dust removing roll 32, which has a circumferential surface brought into contact with the rear surface of the collector foil 1, a first cleaning roll 33, which has a circumferential surface brought into contact with the circumferential surface of the first metal dust removing roll 31, and a second cleaning roll 34, which has a circumferential surface brought into contact with the circumferential surface of the second metal dust removing roll 32. The first metal dust removing roll 31, the second metal dust removing roll 32, the first cleaning roll 33, and the second cleaning roll 34 are arranged so as to have the same axis line direction. A driving force of a driving device (not shown) is transmitted to the first metal dust removing roll 31, the second metal dust removing roll 32, the first cleaning roll 33, and the second cleaning roll 34.

The collector foil 1 enters the metal dust removing device 11 to be sandwiched between the first metal dust removing roll 31 and the second metal dust removing roll 32. The first metal dust removing roll 31 and the second metal dust removing roll 32 are rotated by the driving force of the driving device in a manner that moves the collector foil 1 from the feeding roll 9 to the winding roll 3.

The first cleaning roll 33 is rotated by the driving force of the driving device while in contact with the circumferential surface of the first metal dust removing roll 31. Metal dust adhered to the first metal dust removing roll 31 is removed from the first metal dust removing roll 31 by the rotation of the first cleaning roll 33.

The second cleaning roll 34 is rotated by the driving force of the driving device while in contact with the circumferential surface of the second metal dust removing roll 32. Metal dust adhered to the second metal dust removing roll 32 is removed from the second metal dust removing roll 32 by the rotation of the second cleaning roll 34.

The electrode paste applying device 13 includes a first die coating paste dispenser 35, which applies electrode paste (not shown) to the front surface of the collector foil 1, and a second die coating paste dispenser 36, which applies electrode paste (not shown) to the rear surface of the collector foil 1. The first die coating paste dispenser 35 and the second die coating paste dispenser 36 emit a fixed amount of electrode paste 12 toward the collector foil 1.

The moving speed of the collector foil 1 is kept constant by the revolving speed of the winding roll 3, the first metal dust removing roll 31, and the second metal dust removing roll 32. The rest of the structure is the same as in the fourth embodiment.

As described above, the method of manufacturing an energy storage device electrode according to the fifth embodiment of the present invention differs from the method of manufacturing an energy storage device electrode of the fourth embodiment in that both surfaces of the collector foil 1 are processed simultaneously. As a result, the manufacture of an energy storage device electrode takes a shorter time than in the method of manufacturing an energy storage device electrode of the fourth embodiment.

Although the fourth embodiment and fifth embodiment described above do not mention a step of pressing the electrode paste applied to the collector foil 1 toward the collector foil 1, the electrode paste applied to the collector foil 1 may be pressed toward the collector foil 1 before the collector foil 1 is reeled onto the winding roll 3. Alternatively, the electrode paste applied to the collector foil 1 may be pressed toward the collector foil 1 after the collector foil 1 is reeled onto the winding roll 3, by taking the collector foil 1 off the winding roll 3.

REFERENCE SIGNS LIST 1 collector foil (collector), 1a groove, 1b ungrooved portion, 1c groove, 1d groove, 2 electrode layer, 2a electrode particle, 3 winding roll, 4 embossing roll, 4a embossing pattern, 5 collector terminal portion, 6 electrode pressing roll, 7 contact portion, 8 roller, 8a sandpaper, 9 feeding roll, 10 groove forming device, 11 metal dust removing device, 12 electrode paste (electrode layer), 13 electrode paste applying device, 14 drying furnace, 15 groove forming roll, 16 back roll, 17 toothed-edge disk, 17a projection, 18 smooth-edge disk, 19 end portion, 20 metal dust removing roll, 21 back roll, 22 cleaning roll, 23 paste dam, 24 coating roll, 25 doctor roll, 26 back roll, 27 guide roller, 28 guide roller, 29 first groove forming roll, 30 second groove forming roll, 31 first metal dust removing roll, 32 second metal dust removing roll, 33, first cleaning roll, 34, second cleaning roll, 35 first die coating paste dispenser, 36 second die coating paste dispenser.

The invention claimed is:

1. A method of manufacturing an energy storage device electrode, comprising:
   forming a plurality of grooves in a surface of a collector, wherein each of the grooves is elongated in one direction such that a longitudinal axis of each of the grooves is parallel to the surface of the collector and is shaped so that the respective groove is wider at one end of the respective groove than at another end of the respective groove in the one direction;
   subsequently providing an electrode layer, which comprises a plurality of electrode particles, on the surface of the collector; and
   subsequently pressing the electrode layer toward the collector to move the plurality of electrode particles along the plurality of grooves from the one end toward the another end until the plurality of electrode particles dig into the plurality of grooves.

2. A method of manufacturing an energy storage device electrode according to claim 1, wherein the forming of the plurality of grooves is performed by an embossing process.

3. A method of manufacturing an energy storage device electrode according to claim 1, wherein the forming of the plurality of grooves is performed by sanding with sandpaper or by hairline polishing.

4. A method of manufacturing an energy storage device electrode according to claim 3, wherein the forming of the plurality of grooves is performed in a manner that makes a minimum width value of the plurality of grooves smaller than a mean diameter of the plurality of electrode particles, and makes a mean width value of the plurality of grooves larger than the mean diameter of the plurality of electrode particles.

5. A method of manufacturing an energy storage device electrode according to claim 1, wherein the forming of the plurality of grooves is performed by moving the collector in the one direction while a groove forming roll, which has a plurality of projections on a circumferential surface, is kept in contact with the surface of the collector, and simultaneously rotating the groove forming roll in a direction that goes against a turning force generated in the groove forming roll by the movement of the collector.

6. A method of manufacturing an energy storage device electrode according to claim 5, wherein the groove forming roll is constructed by stacking alternately a plurality of toothed-edge disks, each of which has the plurality of projections formed on the circumferential surface, and a plurality of smooth-edge disks, each of which has a smoothly formed circumferential surface.

7. A method of manufacturing an energy storage device electrode according to claim 1, wherein the forming of the plurality of grooves is performed so that the plurality of grooves are formed in a middle portion of the surface of the collector.

8. A method of manufacturing an energy storage device electrode according to claim 1, further comprising:
   after the forming of the plurality of grooves in the surface of the collector, applying the electrode layer to the surface; and
   subsequently reeling in the collector.

9. A method of manufacturing an energy storage device electrode according to claim 1, further comprising:
   after the forming of the plurality of grooves in the surface of the collector, removing a foreign material adhered to the surface; and
   subsequently reeling in the collector after applying the electrode layer to the surface.

10. A method of manufacturing an energy storage device electrode according to claim 1, wherein inner walls of each of the grooves at the wider end have an arc shape as viewed from a direction perpendicular to the collector.

11. An energy storage device electrode, comprising:
   a collector having grooves formed in a surface thereof, wherein each of the grooves is elongated in one direction such that a longitudinal axis of each of the grooves is parallel to the surface of the collector and is shaped so that the respective groove is wider at one end of the respective groove than at another end of the respective groove in the one direction; and
   an electrode layer provided on the surface of the collector and comprising electrode particles, which dig into the grooves at the another end.

* * * * *